United States Patent
Kunde et al.

(10) Patent No.: US 7,974,918 B1
(45) Date of Patent: Jul. 5, 2011

(54) CREDIT RISK FRAMEWORK

(75) Inventors: Patria Smith Kunde, McLean, VA (US); Elizabeth Marie Dorsey, Arlington, VA (US); Malav Vijay Doshi, Washington, DC (US); Cynthia Huffman Keith, Great Falls, VA (US); Gwen Muse-Evans, Bethesda, MD (US)

(73) Assignee: Fannie Mae, Washington, DC (US)

( * ) Notice: Subject to any disclaimer, the term of this patent is extended or adjusted under 35 U.S.C. 154(b) by 148 days.

(21) Appl. No.: 12/208,221

(22) Filed: Sep. 10, 2008

Related U.S. Application Data

(60) Provisional application No. 60/971,838, filed on Sep. 12, 2007.

(51) Int. Cl.
*G06Q 40/00* (2006.01)
(52) U.S. Cl. ......................................... 705/38
(58) Field of Classification Search ............ 705/38
See application file for complete search history.

(56) References Cited

U.S. PATENT DOCUMENTS

| | | | | |
|---|---|---|---|---|
| 7,047,502 | B2* | 5/2006 | Petropoulos et al. | 715/781 |
| 2006/0059073 | A1* | 3/2006 | Walzak | 705/35 |
| 2007/0136186 | A1* | 6/2007 | Libman | 705/38 |

* cited by examiner

*Primary Examiner* — Harish T Dass
*Assistant Examiner* — Clifford Madamba
(74) *Attorney, Agent, or Firm* — Foley & Lardner LLP

(57) ABSTRACT

A credit risk framework and systems and methods for using the same. The credit risk framework provides information regarding the eligibility of loans to be sold (delivered) to a purchaser, such as in the secondary mortgage market. The credit risk framework includes determining categories of potentially eligible loans. At least one risk segment is determined and an eligibility grid associated therewith. The eligibility grid is organized using two data elements as axes and forming boxes representing ranges of the two data elements. Each box is then further associated with additional information regarding any restrictions on loans that would fall in the box. Each risk segment may have its own level of delegated authority so as to tie risk to a delegation structure.

17 Claims, 19 Drawing Sheets

Not Eligible

| | Property Type A | Property Type B | Property Type C | Property Type D | Property Type E |
|---|---|---|---|---|---|
| Documentation Type X | | Cash outs (includes IO)<br><br>Investors (includes IO) | X | Cash out investors (includes IO) | Cash outs<br><br>Investor<br><br>IO mortgages |
| Documentation Type Y | Cash out investors (includes IO) | Cash outs<br><br>Investors<br><br>ARMs<br><br>IO mortgages | X | Cash out investors<br><br>Cash out ARMs<br><br>investors ARMs<br><br>IO cash outs<br>IO investors | X |
| Documentation Type Z | Cash out investor (includes IO) | X | X | Cash outs (includes IO)<br><br>Investor (includes IO) | X |

LIGHT BLUE Jump Page
OLTV/CLTV AA% - FF%
FICO rrr - qqq

FIG. 7E 636 710
PURPLE Jump Page
OLTV/CLTV GG% - HH%
FICO ttt- sss
702
701

703 ## Not Eligible

| | Property Type A | Property Type B | Property Type C | Property Type D | Property Type E |
|---|---|---|---|---|---|
| Documentation Type X | IO cash out investors | Cash outs<br><br>Investors<br><br>IO mortgages | Cash outs<br><br>Investors<br><br>ARMs<br><br>IO mortgages | Cash out investors<br><br>IO cash outs<br>IO investors | Cash outs<br><br>Investors<br><br>IO mortgages |
| Documentation Type Y | Cash outs (includes IO)<br><br>investors (includes IO) | X | X | Cash outs<br><br>investors<br><br>IO mortgages | X |
| Documentation Type Z | Cash outs<br><br>investors<br><br>ARMs<br>IO mortgages | X | X | X | X |

635 — LIGHT ORANGE Jump Page — 710
702 — OLTV/CLTV AA% - FF%
— HCO ttt- sss

701

Not Eligible

703

| | Property Type A | Property Type B | Property Type C | Property Type D | Property Type E |
|---|---|---|---|---|---|
| Documentation Type X | Cash out investors (includes IO) | Cash outs<br><br>Investors<br><br>ARMs<br><br>IO mortgages | X | Investors (includes IO)<br><br>Cash out<br><br>ARMs<br><br>IO cash outs | X |
| Documentation Type Y | Cash out investors<br><br>IO cash outs | X | X | Cash outs<br><br>Investors<br><br>IO mortgages | X |
| Documentation Type Z | Cash out investors<br><br>Cash out ARMs<br><br>IO cash outs | X | X | Cash outs<br><br>Investors<br><br>ARMs<br><br>IO mortgages | X |

637 — MAUVE Jump Page  
710  
— OLTV/CLTV 66% - III%  
702 — FICO yyy- uuu  
703

Not Eligible

| | Property Type A | Property Type B | Property Type C | Property Type D | Property Type E |
|---|---|---|---|---|---|
| Documentation Type X | Cash out investors<br><br>IO cash outs<br>IO investors | X | X | Cash outs<br><br>Investors<br><br>IO mortgages | X |
| Documentation Type Y | Cash outs<br><br>Investors<br><br>IO mortgages | X | X | X | X |
| Documentation Type Z | X | X | X | X | X |

638 — LIME Jump Page — 710
- OLTV/CLTV AA% - FF%
- FICO vvv- uuu

Not Eligible 701

|  | Property Type A | Property Type B | Property Type C | Property Type D | Property Type E |
|---|---|---|---|---|---|
| Documentation Type X | Cash out investors<br><br>IO Cash outs | X | X | Cash outs (includes IO)<br><br>Investors (includes IO) | X |
| Documentation Type Y | Cash outs (includes IO) | X | X | X | X |
| Documentation Type Z | Cash outs (includes IO) | X | X | X | X |

FIG. 7I

640 — PALE BLUE Jump Page — 710
- OLTV/CLTV GG% - HH%
- FICO www

Not Eligible 701

|  | Property Type A | Property Type B | Property Type C | Property Type D | Property Type E |
|---|---|---|---|---|---|
| Documentation Type X | Cash out investors<br><br>IO cash outs<br>IO investors | X | X | Cash outs<br><br>Investors<br><br>ARMs<br><br>IO mortgages | X |
| Documentation Type Y | X | X | X | X | X |
| Documentation Type Z | X | X | X | X | X |

FIG. 7J

CREAM Jump Page
OLTV/CLTV AA% - FF%
FICO www

Not Eligible

|  | Property Type A | Property Type B | Property Type C | Property Type D | Property Type E |
|---|---|---|---|---|---|
| Documentation Type X | Cash out investors<br>Cash out ARMs<br>IO cash outs | X | X | Cash outs<br>Investors<br>ARMs<br>IO mortgages | X |
| Documentation Type Y | Cash outs (includes IO) | X | X | X | X |
| Documentation Type Z | Cash outs (includes IO) | X | X | X | X |

FIG. 7K

CREDIT RISK FRAMEWORK

CROSS-REFERENCE TO RELATED APPLICATIONS

The present application claims priority to U.S. Provisional Patent Application No. 60/971,838, filed Sep. 12, 2007, the contents of which are incorporated herein by reference in their entirety.

FIELD OF THE INVENTION

The present invention relates generally to the field of providing an indication of types of loans that a purchaser in the secondary mortgage market is willing to purchase.

BACKGROUND OF THE INVENTION

Potential homebuyers typically must borrow at least a portion of the cost of the home from lenders such as banks, credit unions, mortgage companies, savings and loan institutions, state and local housing finance agencies, and so on, to obtain the funds necessary to purchase or refinance their homes using the home as security for the loan. These lenders offer mortgage products to potential home buyers and, after the borrower applies for a loan, underwrite the borrower's loan application. The lenders who make (originate and fund) mortgage loans directly to home buyers comprise the "primary mortgage market."

When a mortgage is made in the primary mortgage market, the lender can: (i) hold the loan as an investment in its portfolio, or (ii) sell the loan. The market for the sale and purchase of mortgages is referred to as "secondary mortgage market". The secondary mortgage market includes sellers, typically lenders, and purchasers, e.g., pension funds, insurance companies, securities dealers, financial institutions and various other investors. Lenders often sell the loans they have issued, typically retaining a small percentage of the income stream from the loan, in order to procure a new supply of funds to make more home mortgage loans, thereby assuring home buyers a continual supply of mortgage credit.

However, most purchasers in the secondary mortgage market have requirements regarding the type of loan that they are willing to purchase. Current systems for communicating the types of loans a purchaser is willing to purchase are cumbersome and unclear. The plethora of loan types as well as the variability in borrowers and lenders themselves leads to a vast array of credit risks for each type of loan and a complex set of criteria for determining whether a loan is eligible for sale to a purchaser.

SUMMARY OF THE INVENTION

Generally speaking, the present invention relates to a credit risk framework and systems and methods for issuing and managing the same. According to one embodiment, a method of creating a credit risk framework including the steps of determining attributes that prevent a loan from being potentially eligible such that all loans are either potentially eligible or not; providing a visual representation of the potentially eligible loans; grouping the loans based upon at least two data elements, into a plurality of groups such that loans exhibiting like risk are grouped together; providing a visual representation of the grouping of loans as at least one eligibility grid; associating with each group of loans, a list of data element properties which exclude from eligibility loans having those data elements; and providing a visual representation of the list of data element properties as a sheet associated with the eligibility grid.

In another exemplary embodiment, a method for establishing the eligibility of a loan for purchase in the secondary mortgage market, includes the steps of determining if the loan is within a group of loans defined as potentially eligible based upon legal, business, and or financial restraints; selecting, based upon the seller of the loan, one of a plurality of eligibility grids that organize loans based on a risk metric; selecting a box within the selected grid, the box corresponding to certain data elements of the loan; and determining if additional information associated with the box indicates the loan is excluded from eligibility.

In another exemplary embodiment, a method of providing a visual representation of loans acceptable to a purchaser in the secondary mortgage market, including the steps of determining a group of loans ineligible to be purchased by the purchaser due to outside restrictions on the purchaser with the remainder of loans potentially eligible for purchase; determining credit risk segments within a group of potentially eligible loans; associating with each credit risk segment an eligibility grid, the eligibility grid having a first axis corresponding to a first data element and a second axis corresponding to a second data element, with each axis having gridlines extending therefrom, the intersection of first axis gridlines and second axis gridlines forming boxes representing potentially eligible loans having the same range of the first data element and the second data element; and associating with each box of the eligibility grid the presence or absence of additional information regarding eligibility based on one or more additional data elements.

In another exemplary embodiment, a computer implemented system for managing a mortgage obligation collateralized by a pool of mortgage backed-securities. The computer implemented system includes a central processing unit (CPU) and a storage device coupled to the CPU and having information stored therein for configuring the CPU to: determine a group of loans ineligible to be purchased by the purchaser due to outside restrictions on the purchaser with the remainder of loans potentially eligible for purchase; determine credit risk segments within a group of potentially eligible loans; associating with each credit risk segment an eligibility grid, the eligibility grid having a first axis correspond to a first data element and a second axis corresponding to a second data element, with each axis having gridlines extending therefrom, the intersection of first axis gridlines and second axis gridlines forming boxes representing potentially eligible loans having the same range of the first data element and the second data element; and associate with each box of the eligibility grid the presence or absence of additional information regarding eligibility based on one or more additional data elements.

In another exemplary embodiment, a credit risk framework. The credit framework comprises an eligibility grid, the eligibility grid has a first axis and a second axis, the first axis depicting borrower credit scores and the second axis depicting loan to value ratios. A plurality of first axis gridlines are provided extending from the first axis and corresponding to a credit score. A plurality of second axis gridlines are provided extending from the second axis and corresponding to a loan to value ratio. A plurality of boxes are defined by the intersection of first axis gridlines and second axis gridlines and representing discrete groupings of loans based the range of credit scores and range of loan to value ratios are defined by the respective gridlines forming each box, wherein some of the plurality of boxes are associated with exclusions that that indicate restrictions on loan eligibility.

BRIEF DESCRIPTION OF THE DRAWINGS

FIGS. 7A-L illustrate jump sheets of one embodiment of the present invention, each jump sheet corresponding to a box or boxes illustrated in the grids of FIGS. 6A-C.

DETAILED DESCRIPTION OF THE PREFERRED EMBODIMENTS

Figure 1:
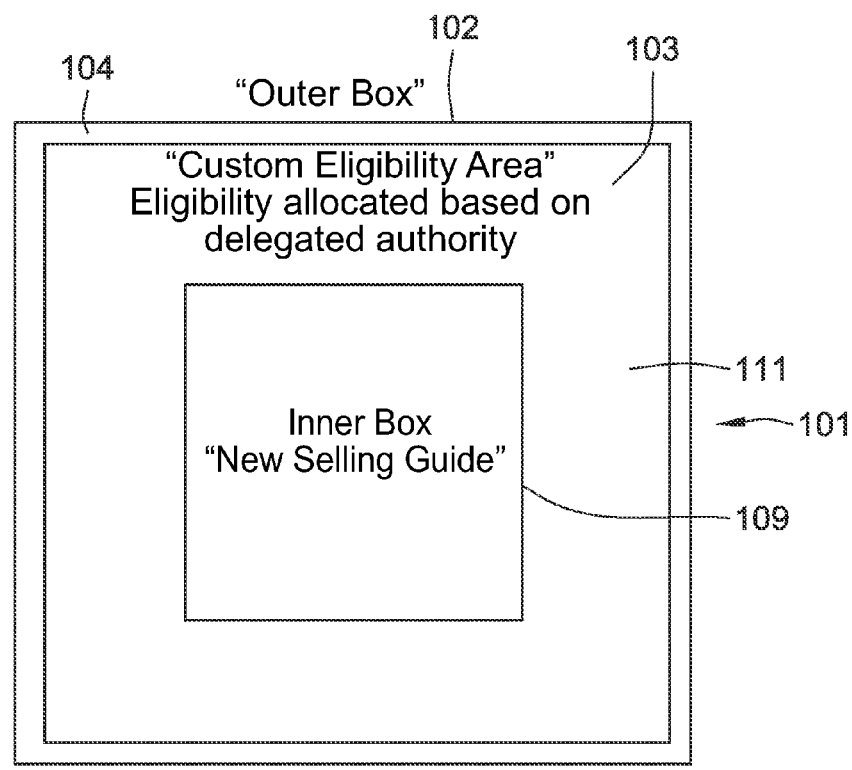
FIG. 1 is an illustration of a diagram separating non eligible loans from potentially eligible loans.

Purchasers of mortgages in the secondary mortgage market typically have a particular range of risk that is acceptable in the loans they are willing to purchase. Purchasers make this determination based in part on data elements associated with the loan. Thus, certain loans are "eligible loans" and certain other loans will be "ineligible loans". Eligible loans are those that the purchaser is willing to purchase. Ineligible loans are those that the purchaser is unwilling to purchase. In accordance with one embodiment, a purchaser in the secondary mortgage market utilizes a credit risk framework to communicate to potential sellers (typically lenders) the range of mortgage products that are ineligible and/or eligible. The credit framework segregates the universe of loans into those that are eligible for purchase by the purchaser and those that are not based on an empirical analysis of risk.

The credit risk framework utilizes a risk metric to assign a risk value to types of loans. In one embodiment, the risk metric is a measure of relative risk of each category of loans vis-à-vis the others rather than an exact measure of the absolute risk of that category of loan. The risk metric utilizes one or more data elements to determine risk. In this manner, the credit risk framework defines acceptable loans using a plurality of data elements associated with the loan. Data elements describe the attributes of a loan. These data elements may concern the loan, such as but not limited to loan dollar amount, the value of the loan compared to the value of the collateral, the type of interest rate structure, and the amount of the interest rate. In addition, the data elements may concern the borrower, including but not limited to borrower credit rating, borrow income levels, and borrower. Further, the data elements may concern the lender, such as but not limited to volume of mortgages sold in the secondary mortgage market, leverage, credit rating.

The credit risk framework may also reflect certain limitations that a purchaser may experience. Purchasers in the secondary mortgage market are often restricted by their own business model, by legal barriers, by capital requirements limitations and so on. The credit risk framework, in one embodiment, reflects these limitations on the purchaser, defining a universe of loans that are not eligible for purchase, either due to risk considerations or due to other limitations on the purchaser as discussed above.

In an exemplary embodiment, the risk metric is a credit risk model fee. The model fee metric utilizes data elements to assign a certain number of basis points (bps). In one embodiment, the model fee metric utilizes as data elements the loan to value (LTV) or combined loan to value ratio (CLTV), a credit score such as Fair Isaac & Co (FICO), product type, property type, occupancy type, loan purpose, document type, and mortgage insurance level. In an exemplary embodiment, the data elements utilized for the risk metric are the only data elements upon which eligibility is determined. At each tier of the credit risk framework, certain data elements are utilized to determine if the loan is eligible or not. All of the data elements used in the credit risk framework provide an aggregate risk indication for the loans they describe. Any other data elements not used in the credit risk framework (for risk determination), may be used to determine the pricing of the loans in the credit risk framework. Thus, any data elements used in the credit risk framework are used to determine if the purchaser is willing to buy the loan but not how much the purchaser will pay for the loan. Any remaining data elements not used in the credit risk framework may be used to affect the price the purchaser is willing to pay for a loan, but not whether the purchaser is willing to buy the loan.

The credit risk framework provides layers or tiers of restrictions regarding data elements in order to determine eligibility. Each tier removes some loans from potential eligibility and categorizes them as non-eligible loans with the remainder of potentially eligible loans grouped based on similarity of data elements. Each subsequent tier adds more data elements and more restrictions. The credit risk framework can consist of as many tiers as a purchaser feels are necessary to define the type of loans that are eligible for purchase.

Figure 2:
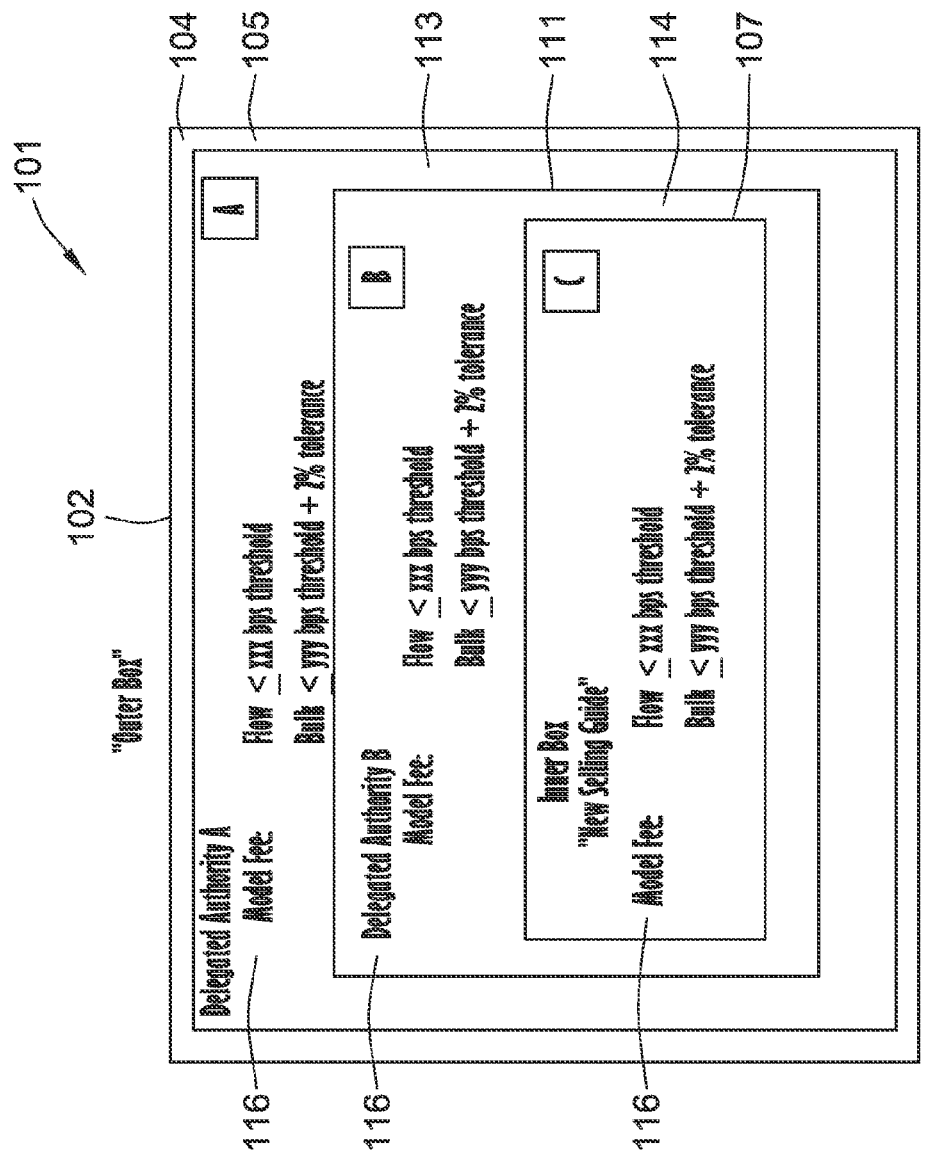
FIG. 2 is an illustration of a diagram depicting potentially eligible loans in risk segments.
Figure 3:
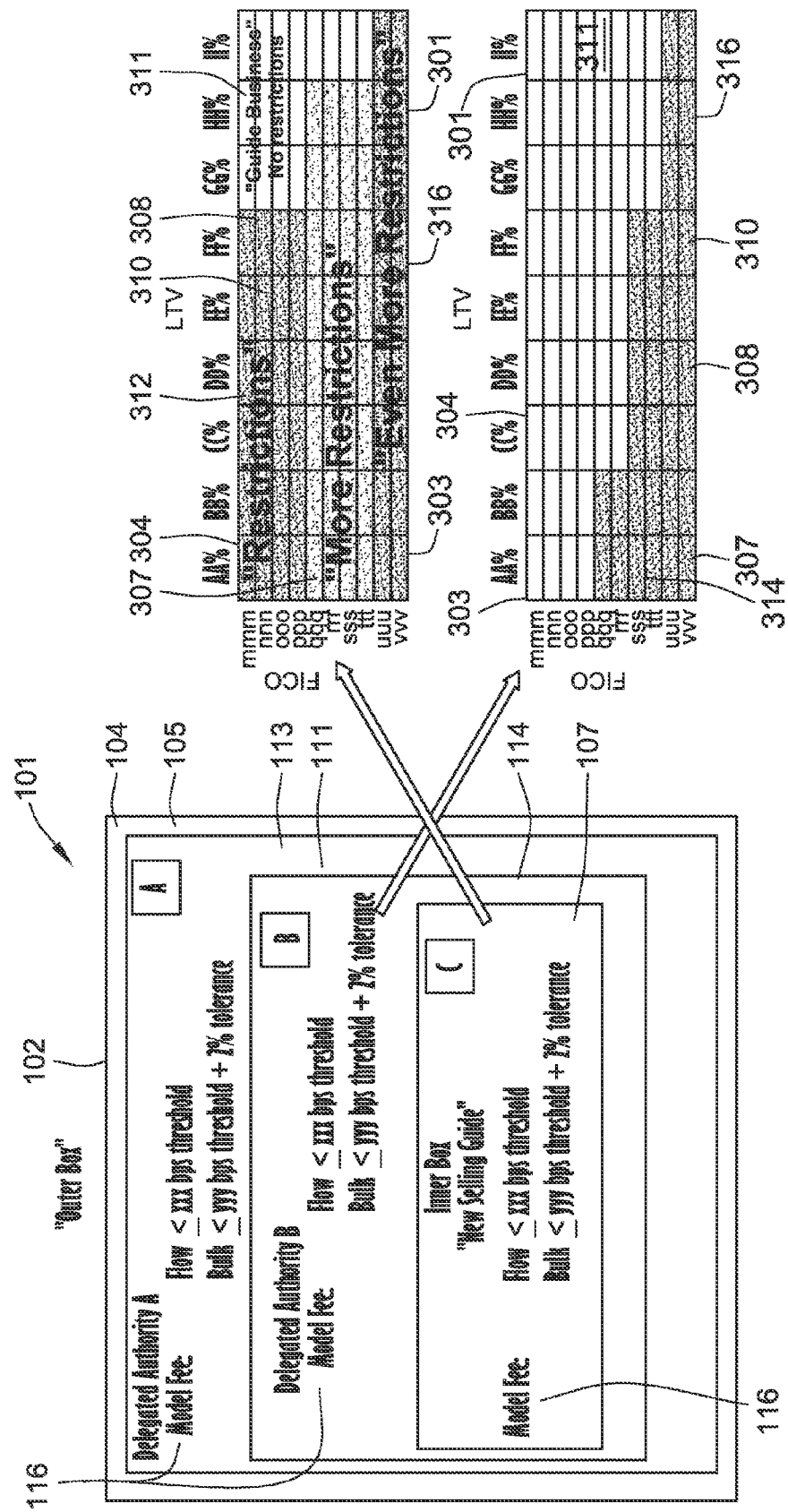
FIG. 3 is an illustration of a diagram depicting potentially eligible loans in risk segments as well as the eligibility grids corresponding to those risk segments.

In one exemplary embodiment shown in FIGS. 1-3, a credit risk framework 101 may be visualized as a two dimensional shape 102 whose perimeter 104 defines the boundary between eligible and ineligible loans. All of the potentially eligible loans lie within the shape 102, with the area 103 outside the perimeter 104 of the shape 102 representing the non-eligible loans. A segment 107 within the shape 102 represents the loans that are eligible by default for all sellers. In one embodiment, the segment 107 is visualized as substantially in the center of the shape 102. The subarea 111 between the segment 107 and the perimeter 104 of the shape 102 represents custom eligibility loans, i.e., loans that are not automatically eligible through the default eligibility segment, but which may be eligible if certain requirements are met.

In an exemplary embodiment, the category of loans defined as being potentially eligible for purchase may be further divided into risk segments. Risk segments represent a grouping of loans having similar data elements and risk. The credit risk framework can be used to tie risk for a particular segment of loans to a specific level of delegated authority. For example, credit and counterparty risk may be tied to a delegation structure. FIG. 2 illustrates an embodiment wherein a default eligibility segment 107 and two delegated authority segments 113, 114 are utilized. In FIG. 2 includes delegated authority segment A 113 and delegated authority segment B 114 are illustrated as substantially overlapping and as being disposed within the overall shape 102 representing the pool of potentially eligible loans in the credit risk framework.

The delegation structure represents one or more levels of authority, typically within the purchaser, that must approve a loan (or group of loans) for purchase. In one embodiment the delegation structure may represent a series of nested levels of authority, each level of delegated authority requiring a higher level of authority for approval. For embodiments utilizing the model risk fee metric, the bps value can be used to place the loans within a segment. For example, as seen in FIG. 2, a model fee threshold 116 can be provided to indicate which risk segment should be used. Thus, a different set of eligible loans than the default eligible loans can be designated, such as for a specific seller (such as one with extensive prior dealings with the purchaser) or a specific range of loan risk. In an exemplary embodiment, the application of the default eligibility structure or one of the delegated structures is based upon the lender, such that a certain lender may qualify for application of a delegated structure in determining which loans the purchaser can purchase. The delegated authority segments may represent a more relaxed risk outlook, wherein a broader range of loans are eligible with relatively fewer restrictions. In the alternative, delegated authority segments may represent a more conservative risk outlook, wherein a narrower range of loans are eligible for purchase and with relatively greater restrictions.

FIG. 3 illustrates a visualization an embodiment of the invention where eligible loans are subdivided into a delegated authority segment based on counterparty risk, measured by risk model fees in the embodiment of FIG. 3. For embodiments further parsing the eligible loans according to level of delegated authority, the levels of delegated authority, and their associated loans, are viewed as including at least a portion of the default eligibility segment 108 as well as at least a portion of the custom eligibility segment 111. In an exemplary embodiment, a plurality of levels of delegated authority are provided, each visualized as a delegated authority segment 112. In one embodiment, the visualization of the credit risk framework further includes an indication of the risk metric value for each set of eligible loans. As seen in FIG. 3, for embodiments utilizing a model fee, the threshold for qualification 116 for each of the segments 107, 113, 114 within the shape 102 is displayed within the respective segments 107, 113, 114.

In one embodiment the risk metric accounts for distinctions between flow transactions and bulk transactions, providing for a qualification threshold for each that may differ. In a further embodiment, the qualification threshold for bulk transactions may include a modifier to account for a predetermined tolerance determined based upon the relative risk of bulk transactions compared to flow transactions.

Figure 5:
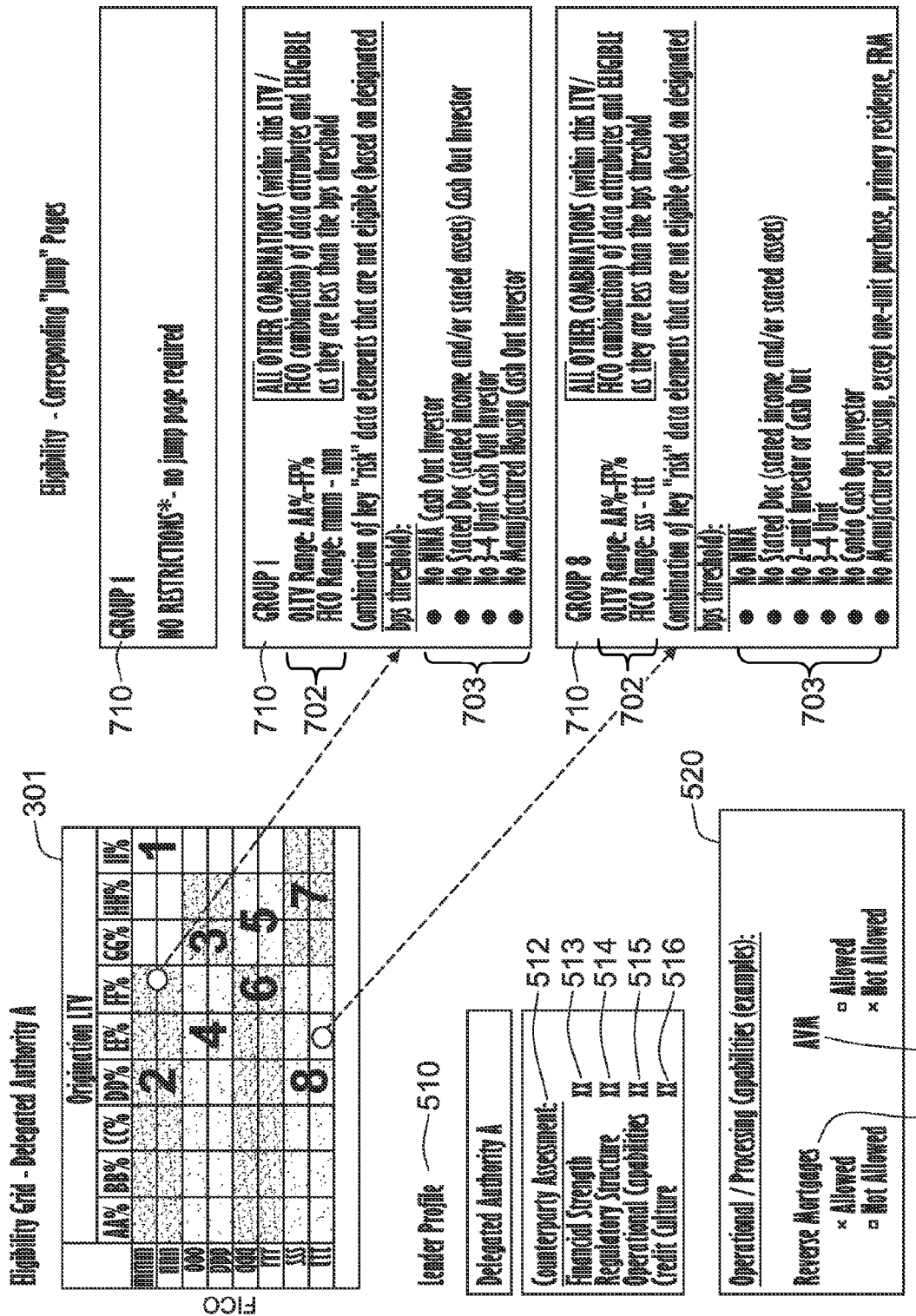
FIG. 5 is an illustration of an eligibility grid of the present invention and associated lender profile and jump pages.

In an exemplary embodiment, the use of a delegated authority segment rather than the default eligibility segment is determined based on attributes of the lender. Such attributes may be included in a lender profile that indicates what attributes are necessary for a lender to qualify for the delegated authority. As shown in FIG. 5, the lender profile 510 includes counterparty assessment information 512, such as financial strength 513, regulatory structure 514, operational capabilities 515, and credit culture 516. The lender profile 510 also includes operational/processing capabilities 520, which typically alternative options for non-standard mortgage loans such as, but not limited to, reverse mortgages 521 and automated valuation model appraisals (AVM) 523.

Figure 4:
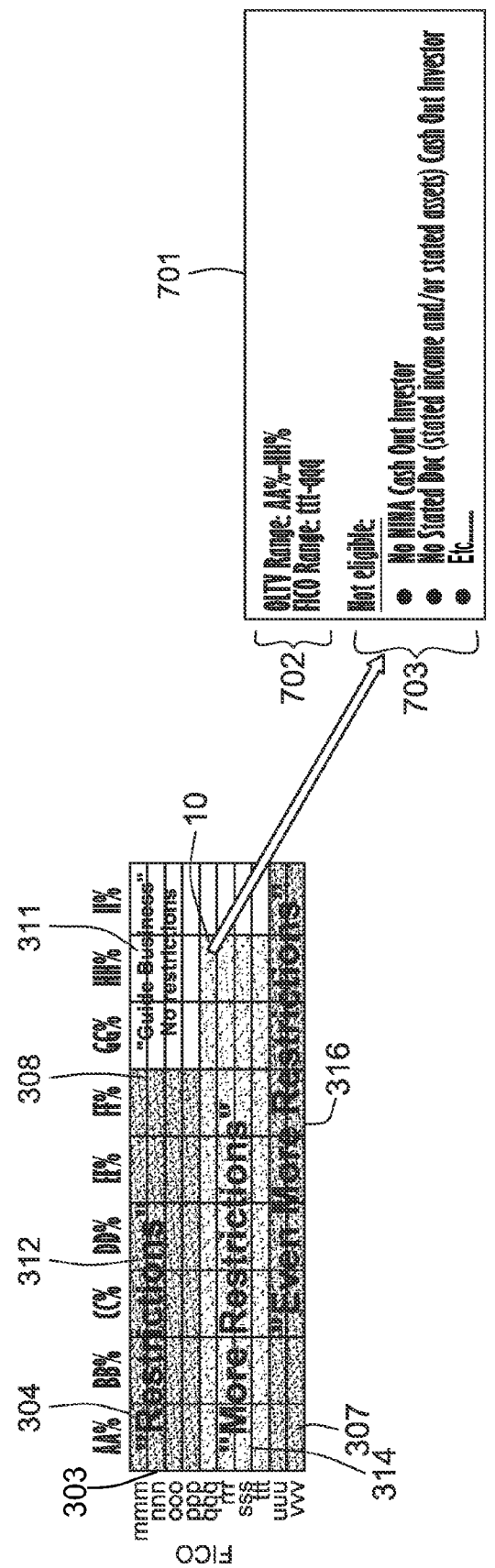
FIG. 4 is an illustration of an eligibility grid having various levels of restrictions on eligibility and a corresponding jump page for one level of restriction.

Another method of visualizing the credit framework comprises utilizing an eligibility grid structure. In an exemplary embodiment, each risk segment is associated with an eligibility grid. Thus, a multitude of individual mortgage products may be associated with a single eligibility grid. Where more than one risk segment is present, such as a default eligibility segment and a delegated authority segment, each segment has an associated grid. The eligibility grid has at least two axes, with each axis being associated with a characteristic contributing to the calculation of risk. For example FIGS. 3-5 and 6A-6C depict an embodiment of a two-dimensional eligibility grid 301 having two axes 303, 304 perpendicular to each other, with the vertical or y-axis 303 being the credit score of the borrower (depicted in this case as the borrowers FICO score) and the horizontal axis or x-axis 304 being the loan to value ratio of the loan (or the CLTV ratio for loans whose collateral collateralizes more than one loan). As can be seen in FIGS. 3 to 5, horizontal grid lines 307 and vertical gridlines 308 extending from the axes define a box 310 on the grid. Each box 310 represents a group of loans having data elements within the range defined by the gridlines 307, 308 (i.e. by the corresponding value for each of the axes 303, 304 respectively), all of the loans meeting the defined attributes being eligible loans (either via default eligibility or delegated authority).

In one embodiment, not all loans defined by the attributes associated with each box are eligible loans. For example, in an exemplary embodiment, for each box 310, additional information is associated with each box 310 regarding the loans defined by the box 310. Such information may provide restrictions for eligibility of loans. The additional information may be inclusionary or exclusionary, i.e., the additional information may indicate data elements required for loans to be eligible loans or may indicate data elements of loans that will prevent them from being eligible loans.

By selecting the gradation and direction of the axes 303, 304, it is possible to organize the eligibility grid into restriction levels, i.e. areas of the eligibility grid having identical or similar levels of restriction (or inclusions) as evidence by the additional information. FIGS. 3 and 4 illustrate a eligibility grid for default eligibility having a "no restriction" area 311, a "restrictions" area 312, a "more restrictions" area 314, and a "even more restrictions" area 316, with each area having more restrictions than the preceding area and thus encompassing a smaller number of the loans than would otherwise be categorized within the box based solely on the data elements defined by the axes 303, 304. This additional information may be displayed on its own or as part of the box 310. The presence (or absence) of additional information may be indicated, such as visually, for the boxes of the grid.

In an exemplary embodiment, the additional information may constitute further limitations on the loans within the box that are required for the loan to be an eligible loan. In one embodiment, the additional information may constitute the existence of no additional limitations on the loans within the box in order for them to be eligible loans, i.e. all of the loans within the box are eligible loans, as shown in FIG. 3 with group 311.

FIGS. 4, 5, and 7A to 7L illustrate an embodiment wherein the additional information is displayed on a "jump sheet". The jump sheets, in one embodiment, include information relating to the lender, information relating to the loan, and information relating to the borrower. As shown in FIG. 4, the jump sheet 701 may further include a reference identifier, such as a header 702, to identify at least some of the data elements associated with the loans encompassed by the jump sheet 701, for example the range of x-axis and y-axis value ranges associated with the box 510. The additional information is displayed on the jump sheet 701 as additional information text 703.

As previously mentioned, in one embodiment, the boxes 510 can be grouped based on associated risk. In a further embodiment, the jump sheet 701 includes group information 710. The group information 710 indicates with which group of boxes the jump sheet 701 is associated. FIG. 5 illustrates an embodiment where the boxes have been designated a group number and the associated jump page 701 includes that group number at 710. Additional indicators may be provided to identify the box 310 or boxes with which the jump sheet 701 is associated. For example, but without limitation, such additional indicators may include the use of a key-code system such as a colored box 310 or boxes that have identical or corresponding colors on their associated jump sheets 701.

Figure 6A:
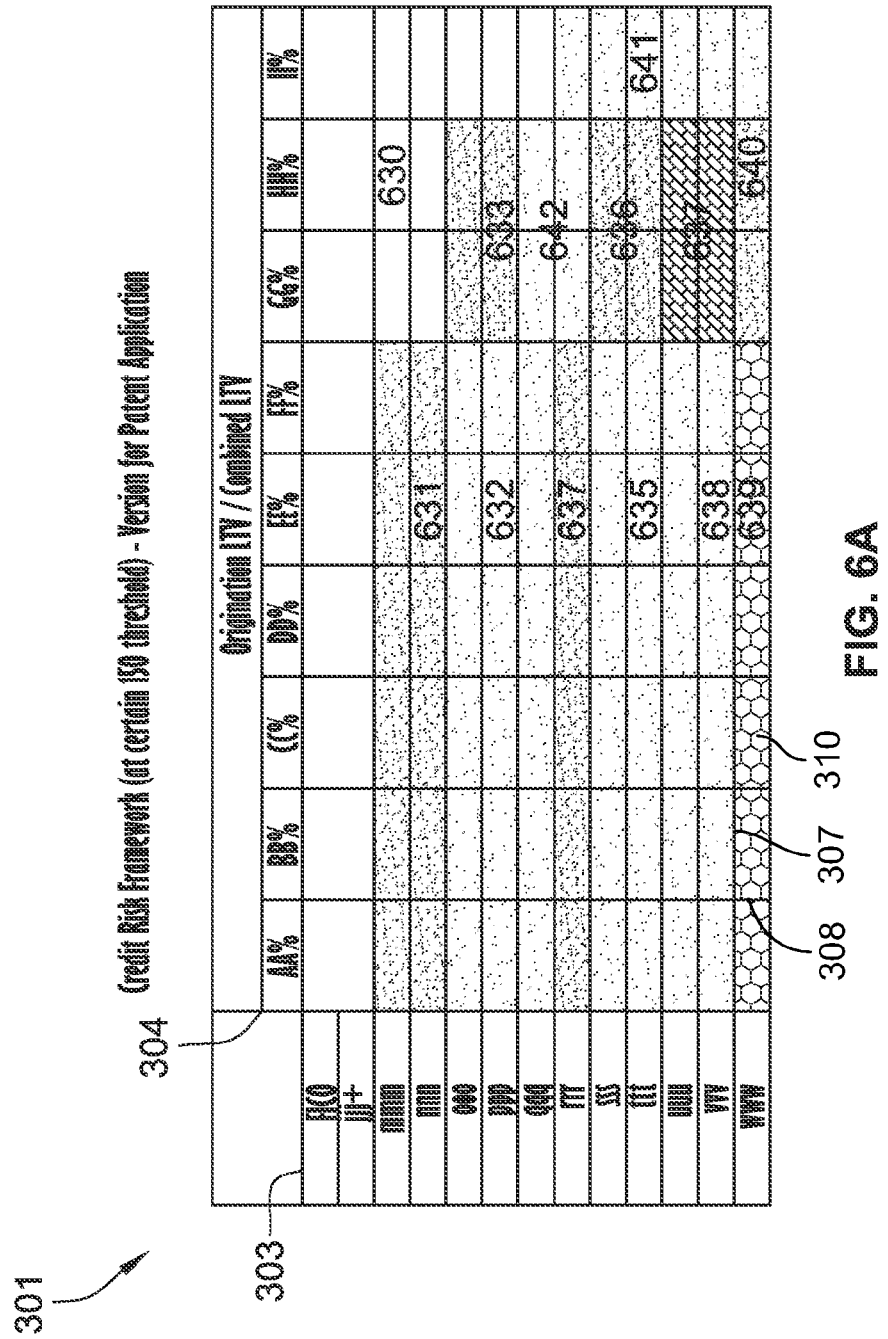
FIGS. 6A-C illustrate an eligibility grid in accordance with the present invention.
Figure 6B:
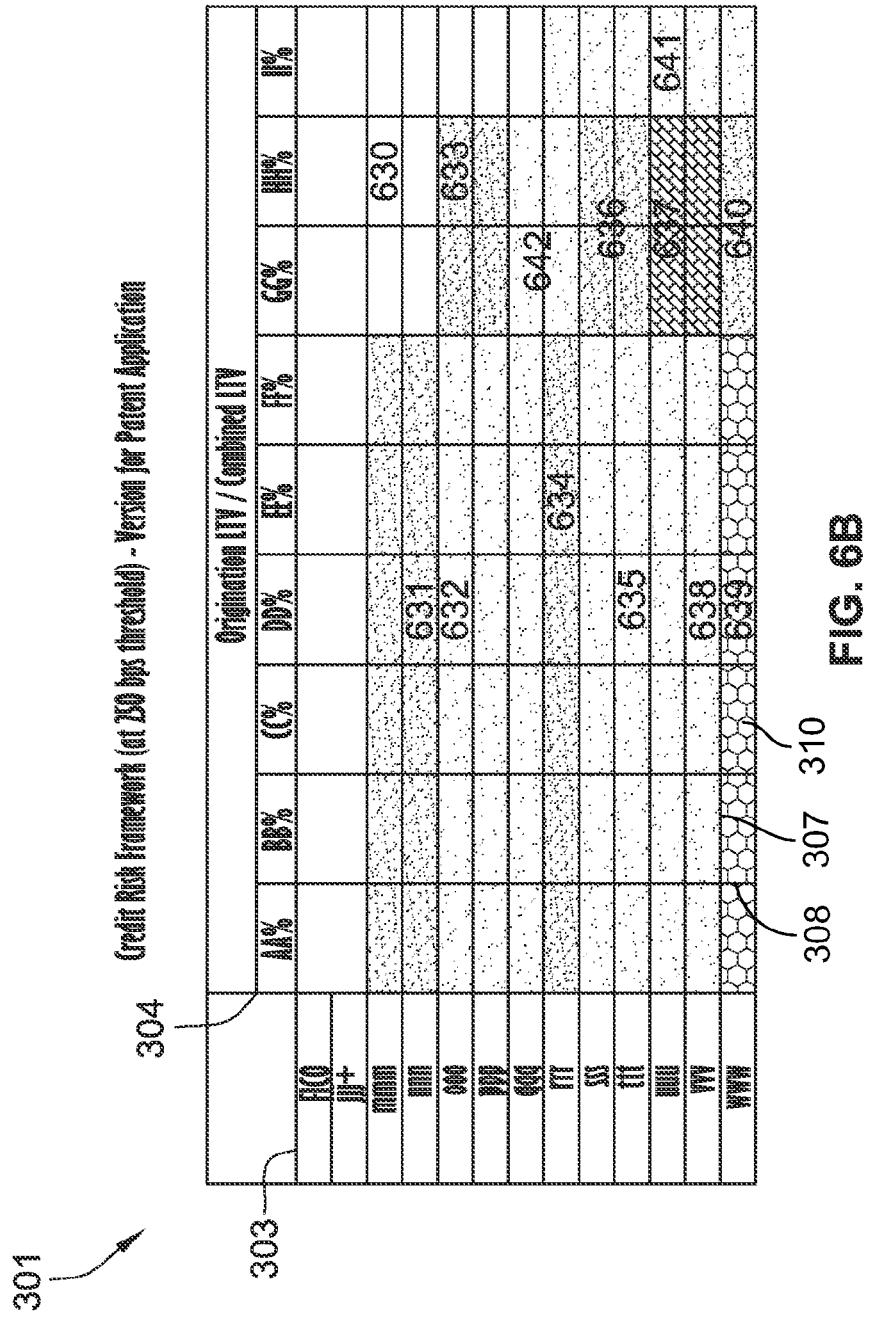
Figure 6C:
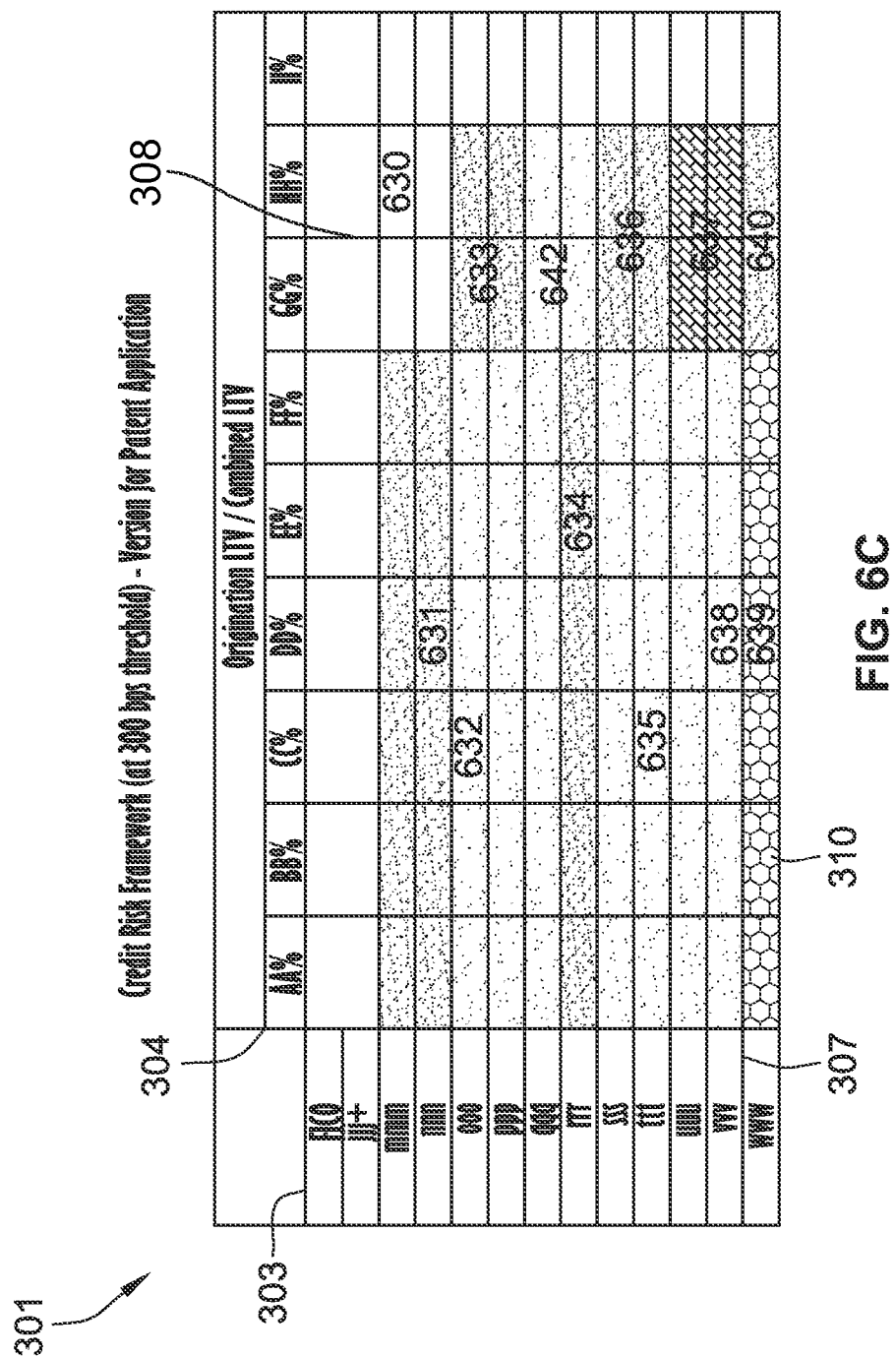
Figure 7A:
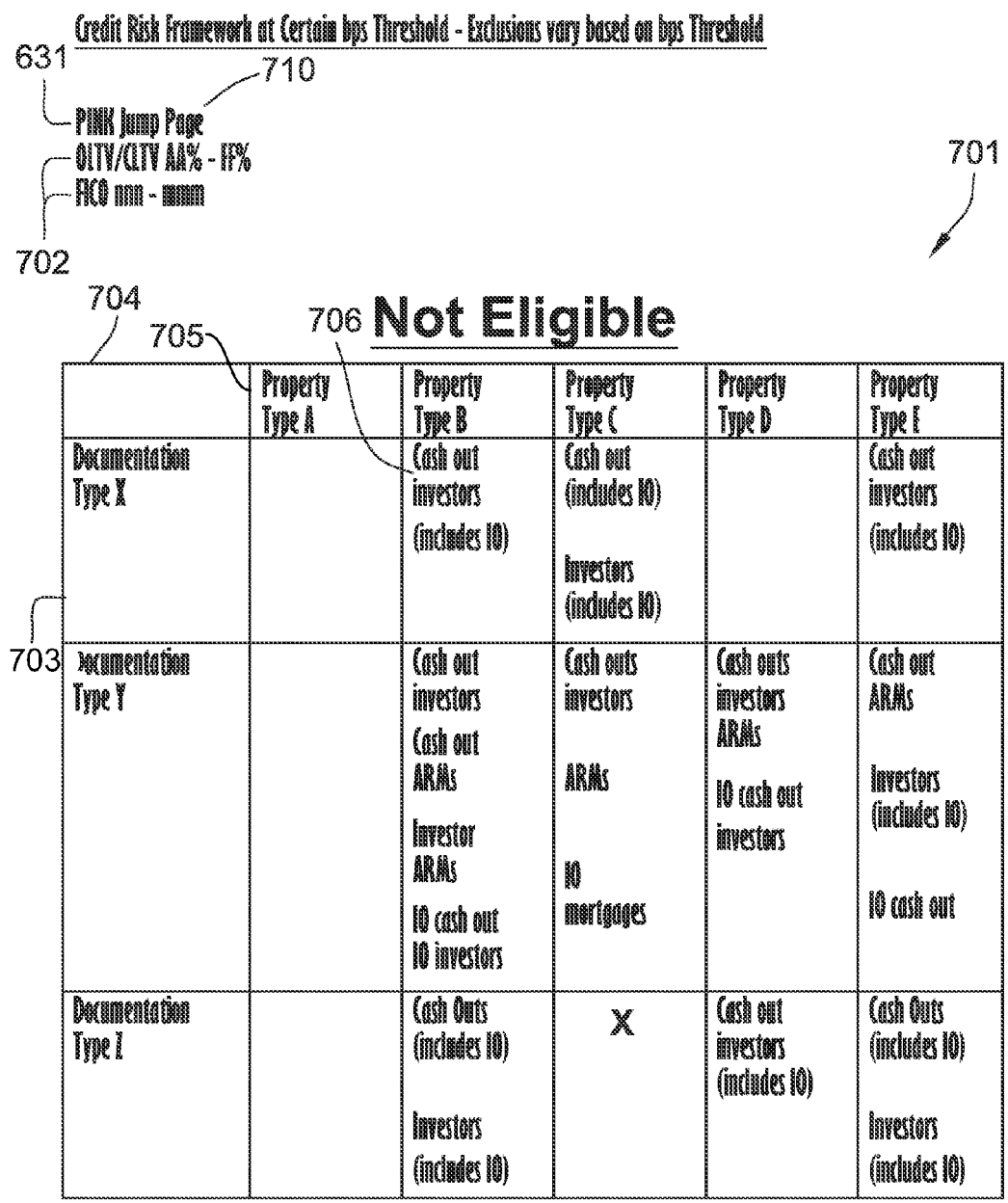
Figure 7B:
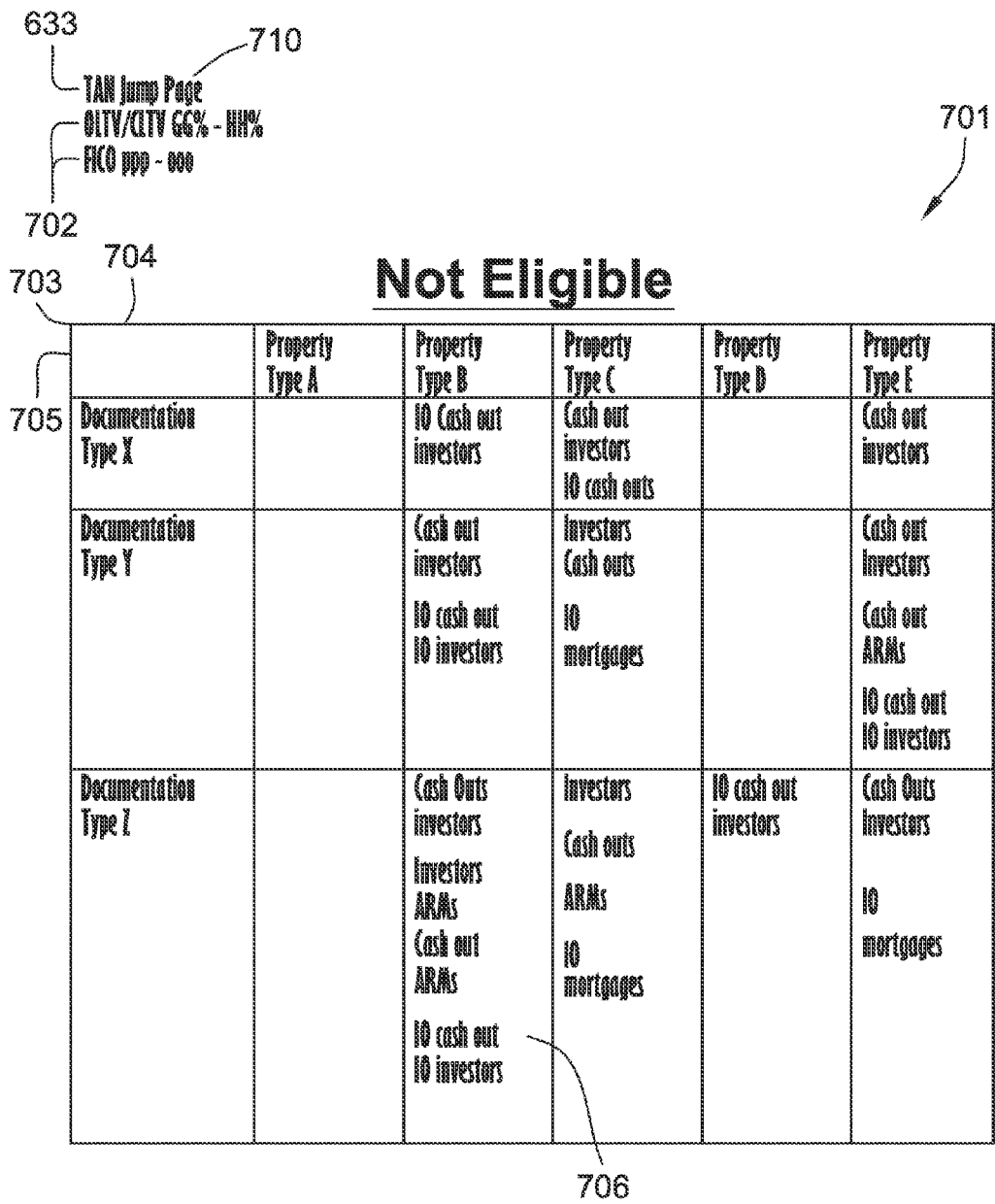
Figure 7C:
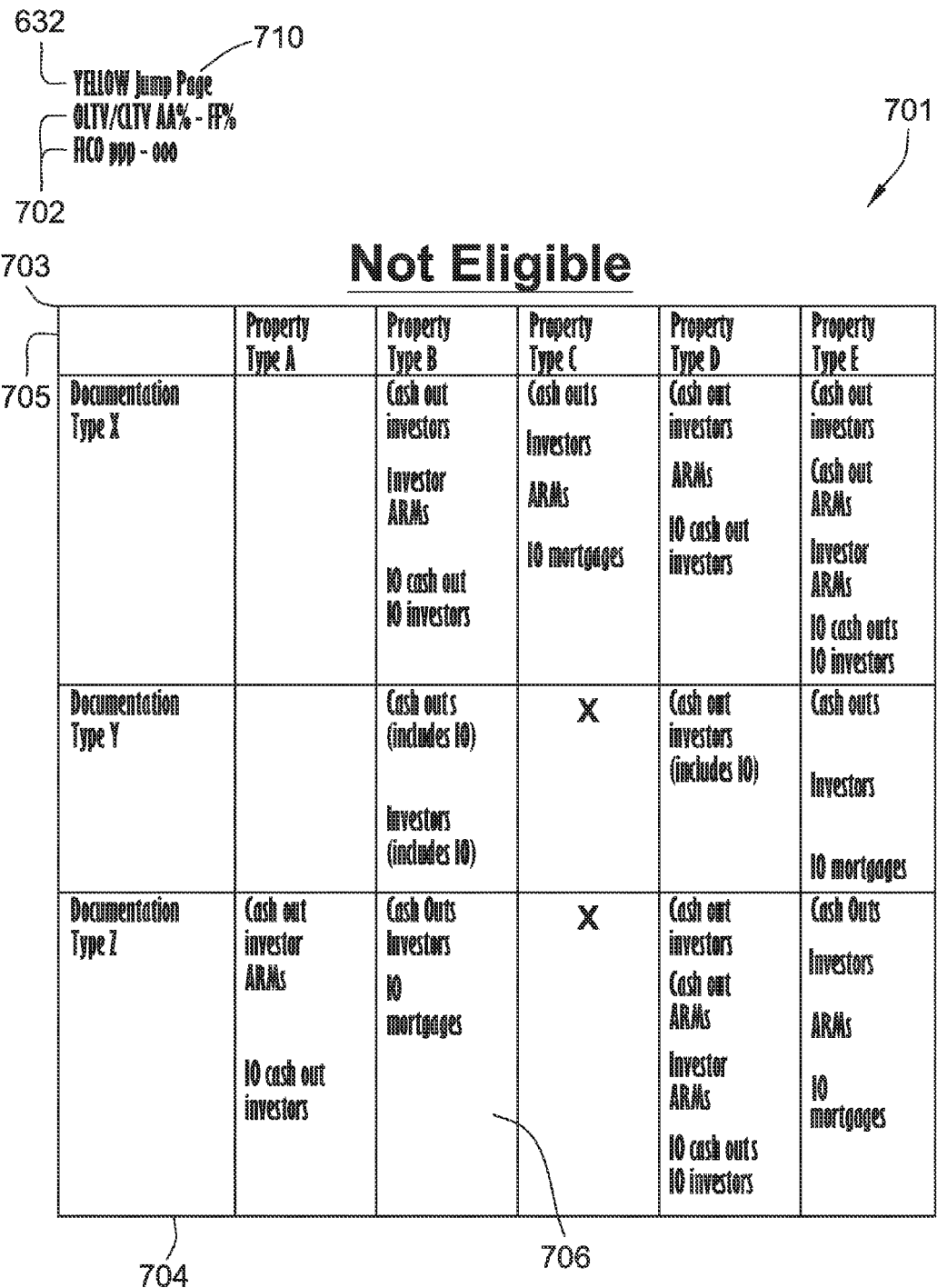
Figure 7D:
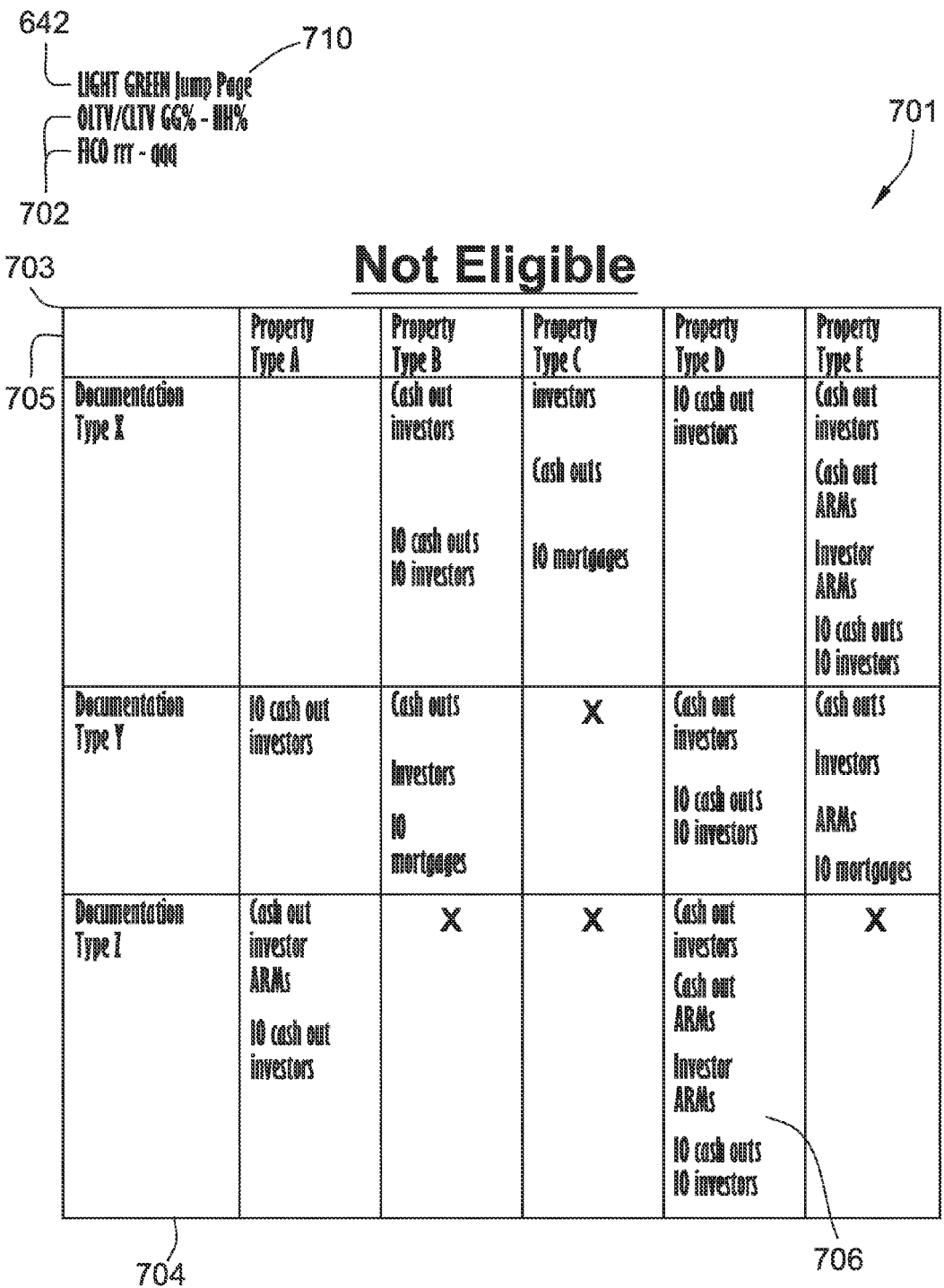
Figure 7L:
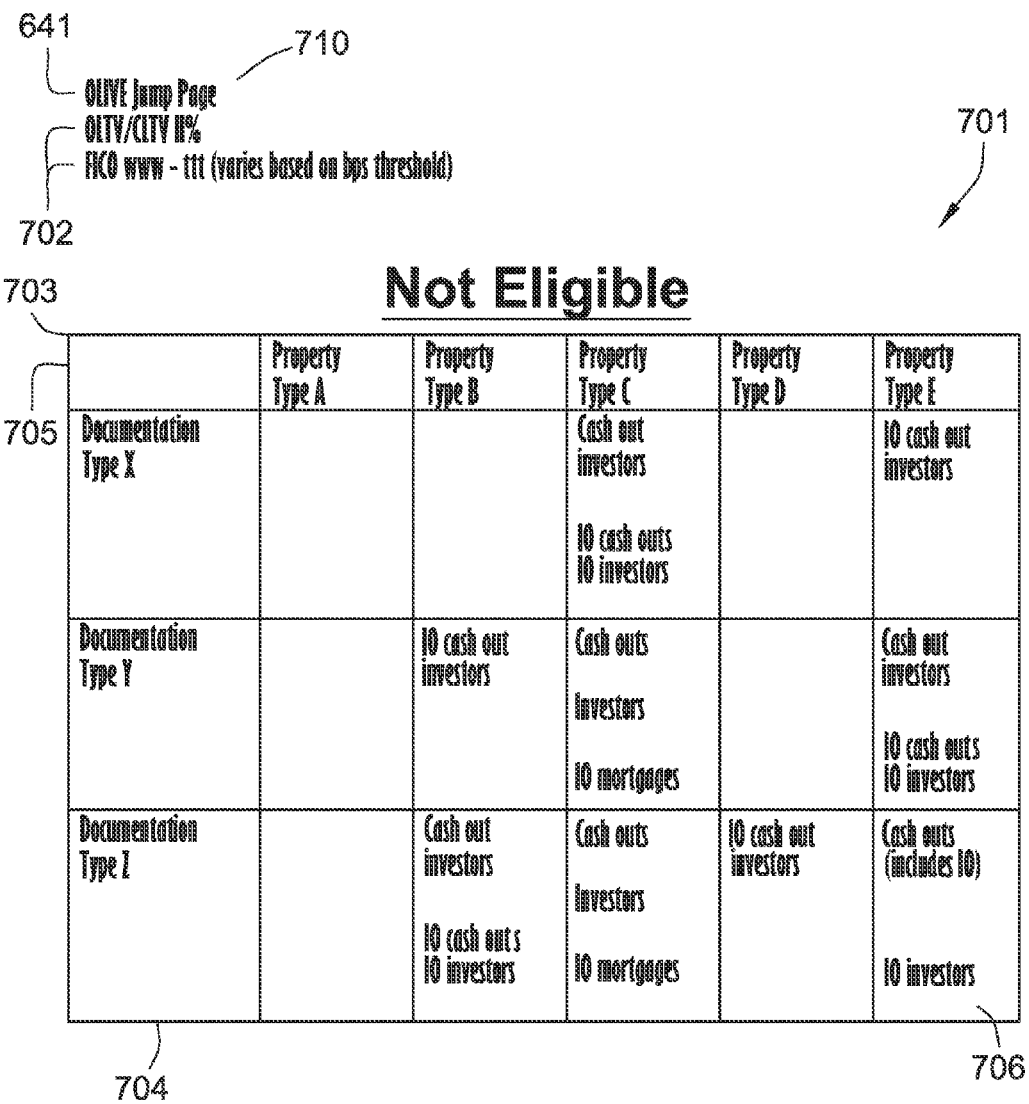

Furthermore, boxes from different grids (and therefore different risk segments) can be associated with the same jump page. FIGS. 6A-6C illustrate eligibility grids for risk segments having model risk fees of 150, 250, and 300 bps respectively. As can be seen, the groupings 630-642 of the specific boxes 510 on each eligibility grids 301 changes as the model fee changes, but each utilizes the same jump pages 701 associated with each group 630-642. FIGS. 7A-7L illustrate the jump pages 701 that correspond to all three of the eligibility grids in FIGS. 6A-6C. It should be understood that any number of different eligibility grids 301 could utilize the same set of jump pages 701.

In an alternative embodiment shown in FIGS. 7A-7L, the additional information text 703 is further organized to include a matrix correlating the additional information to specific data elements. For example, FIGS. 7A-7L organize the additional information based upon document type 704 and property type 705, providing document and property specific additional information 706.

In an exemplary embodiment, the jump sheets 701 are presented as a separate document, such as a separate sheet of paper. In an exemplary embodiment, the credit risk framework is a component of an automated system such as a computer system. The computer system includes a graphical user interface, a processor, and memory. The credit risk framework, in one embodiment, is resident in the memory of the computer system and the graphical user interface is configured to display the credit risk framework when requested by a user. In one embodiment, the shape 102 is displayed on a graphical user interface, including all of the risk segments therein. Each risk segment may be associated with a corresponding eligibility grid, such that selecting or "mousing over" on the segment results in the corresponding eligibility grid being displayed.

For embodiments utilizing a graphical user interface, the jump sheets maybe displayed in a number of ways to provide information to the user. In one exemplary embodiment, the jump sheets are associated with the eligibility grid such that selecting or "mousing over" a square in the eligibility grid results in a subwindow being displayed, preferably also on the graphical user interface.

In a further embodiment, the credit risk framework is implemented as a web based feature that is accessible over a network connection (e.g., over the World Wide Web). The functionality of the credit risk framework is implemented by one or more programs running on a web server or application server associated with such home and mortgage related product web site. An entity seeking to sell loans on the secondary mortgage market, such as a lender, accesses the credit risk framework web site through the World Wide Web or Internet network using a client machine. The client machine may be located at a user's home or office and is connectable to the Internet through an Internet Service Provider (ISP) or other available connection means. In one embodiment, the client machine may require authorization or be required to provide authentication before accessing the credit risk framework. As is well known, a client machine makes a request to a web server identified by a uniform resource locator (URL) and receives in return a web page formatted according to a Hyper Text Markup Language ("HTML") or similar markup language, such as SGML or XML. In an alternative embodiment, the risk segments include hyperlinks to the corresponding eligibility grid and the boxes of the eligibility grid include hyperlinks to a web page that displays the corresponding jump sheet.

In a further embodiment, the lender profile 510 illustrated in FIG. 5 can be displayed as discussed above for the jump sheets to provide an indication of the lender profile for a currently displayed grid.

In a further embodiment, the information and restrictions expressed in the eligibility grid can be expressed as a business rule or a series of business rules. The business rules could, in an exemplary embodiment, be integrated with an underwriting or other loan procurement system of the purchaser to provide an indication as to the eligibility of the loan. Also, the business rules could be implemented as part of a loan originator system of the lender, such that the business rules are accessed during origination to ensure a loan is eligible before it closes.

The invention is described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As described above, many of the embodiments of the credit risk framework include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, PROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection can properly be termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments may be described in the general context of method steps which may be implemented by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hard-wired links, wireless links, or by a combination of hardwired or wireless links) through a communications network. In a distributed computing environment, program modules may be located in both local and remote memory storage devices.

An exemplary system for implementing the overall system or various portions thereof may include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer implemented system for creating a credit risk framework, comprising:
   a plurality of central processing units (CPUs); and,
   a storage device having instructions stored therein that when executed direct the one or more of the plurality of CPUs configured to:
   categorize loans into a group of ineligible loans and a group of potentially eligible loans in regard to purchase by a purchaser;
   for a default eligibility segment for which no additional authorization is necessary to approve loans grouped therein and at least one delegated authority segment for which additional approval is necessary for loans grouped therein, group the potentially eligible loans based upon at least two data elements selected from the group consisting of CLTV, LTV, and credit score into a plurality of groups, wherein each group comprises potentially eligible loans corresponding to the same range for each of the at least two data elements for the respective default eligibility segment or at least one delegated authority segment,
   indicate groups having similar risk such that potentially eligible loans from different groups exhibiting like risk are indicated;
   for the default eligibility segment and each of the at least one delegated authority segment, provide a visual representation of the grouping of potentially eligible loans and the indication of groups having similar risk as at least one eligibility grid for each of the at least one level of delegated authority;
   associate with one or more of the group of loans, properties of additional data elements reflective of attributes of loans which exclude from eligibility those loans having those data element properties; and,
   for each group of loans provide a visual representation of the additional data element properties as a sheet associated with each of the plurality of groups containing information regarding eligibility.

2. The system of claim 1, further comprising a plurality of sheets representing different data element property combinations.

3. The system of claim 2, wherein the grouping of potentially eligible loans is visually represented by a plurality of eligibility grids, with each eligibility grid associated with the same plurality of sheets.

4. The system of claim 1, wherein the potentially eligible loans are organized according to a risk metric.

5. The system of claim 4, wherein the risk metric is the model fee risk metric and further wherein the default eligibility segment and each of the delegated authority segments have an assigned range of model fees.

6. The system of claim 1, further comprising a plurality of delegated authority segments.

7. The system of claim 1, wherein the at least one delegated authority segment represents a variance from the default eligibility segment.

8. A computer implemented system for establishing the eligibility of a loan for purchase in the secondary mortgage market, comprising:
   a plurality of central processing units (CPUs); and
   a storage device having instructions stored therein that when executed direct the one or more of the plurality of CPUs configured to:
   categorize the loan as within a group of loans defined as potentially eligible based upon legal, business, and or financial restraints or within a group of loans defined as ineligible;
   display a grouping for a default eligibility segment for which no additional authorization is necessary to approve loans grouped therein and at least one delegated authority segment for which additional approval is necessary for loans grouped therein of the potentially eligible loans based upon at least two data elements selected from the group consisting of CLTV, LTV, and credit score into a plurality of groups, wherein each group comprises potentially eligible loans corresponding to the same range for each of the at least two data elements for the respective default eligibility segment or at least one delegated authority, indicate groups having a similar risk metric such that potentially eligible loans from different groups exhibiting like risk metric are indicated;

select, based upon the seller of the loan and the risk metric associated with the loan, one of a plurality of eligibility grids that organize loans based on a risk metric;

select a box within the selected grid, the box corresponding to a first data element and a second data element, each data element respectively forming an axis of the grid; and display a jump sheet corresponding to a risk segment associated with the selected box, the jump sheet containing additional information regarding loan eligibility restrictions associated with that risk segment.

9. The system of claim 8, further comprising identifying the type of purchase transaction as either a bulk transaction or a flow transaction.

10. The system of claim 8, wherein selecting one of the plurality of eligibility grids comprises comparing data elements regarding a lender with a lender profile associated with each of the plurality of eligibility grids.

11. The system of claim 10, wherein the lender profile indicates attributes needed by a lender to perform certain functions.

12. The system of claim 8, further comprising a plurality of delegated authority segments.

13. The system of claim 8, wherein the risk metric is the model fee metric.

14. The system of claim 13, wherein the default eligibility segment and each of the delegated authority segments have an assigned range of model fees.

15. The system of claim 13, wherein the higher the model fee associated with a risk segment, the larger the number of loan categories therein that can be eligible loans.

16. The system of claim 8, wherein the group of potentially eligible loans is visualized by a perimeter of a two-dimensional shape such that all of the ineligible loans are outside of the shape and all loans inside of the shape are eligible for purchase.

17. A computer implemented system for managing a mortgage obligation collateralized by a pool of mortgage backed-securities, comprising:

a plurality of central processing units (CPUs); and a storage device having instructions stored therein that when executed direct the one or more of the plurality of CPUs configured to:

categorize loans into a group of ineligible loans and group of potentially eligible loans in regard to purchase by a selected purchaser;

for a default eligibility segment for which no additional authorization is necessary to approve loans grouped therein and at least one delegated authority segment for which additional approval is necessary for loans grouped therein, group the potentially eligible loans based upon at least two data elements selected from the group consisting of CLTV, LTV, and credit score into a plurality of groups, wherein each group comprises potentially eligible loans corresponding to the same range for each of the at least two data elements for the respective default eligibility segment or at least one delegated authority segment, determine credit risk segments within the group of potentially eligible loans;

display an eligibility grid associated with at least one of the credit risk segments, the eligibility grid having a first axis corresponding to a first data element and a second axis corresponding to a second data element, with each axis having gridlines extending therefrom, the intersection of first axis gridlines and second axis gridlines forming boxes representing potentially eligible loans having the same range of the first data element and the second data element;

group the loans represented by the boxes into risk segments, each risk segment associated with loans having similar risk;

provide a visual representation of the risk segments on the eligibility grid as risk segment groupings of the boxes such that potentially eligible loans from different groups exhibiting like risk are indicated;

ling jump sheet to each risk segment grouping of boxes, the jump sheet containing additional information regarding eligibility restrictions associated with that risk segment; and provide a visual representation of the corresponding jump sheet upon selection of one of the boxes.

* * * * *